(12) United States Patent
Joshi et al.

(10) Patent No.: US 11,703,685 B1
(45) Date of Patent: Jul. 18, 2023

(54) DYNAMIC ADJUSTMENT OF MICROMIRROR FOR HEADS-UP DISPLAY USING PHOTOCHROMATIC MATERIAL

(71) Applicant: Toyota Motor Engineering & Manufacturing North America, Inc, Plano, TX (US)

(72) Inventors: Shailesh N Joshi, Ann Arbor, MI (US); Ercan M Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/587,364

(22) Filed: Jan. 28, 2022

(51) Int. Cl.
| | | |
|---|---|---|
| G02B 27/01 | (2006.01) | |
| G09G 3/02 | (2006.01) | |
| G02B 26/10 | (2006.01) | |
| G02B 26/08 | (2006.01) | |
| B60K 35/00 | (2006.01) | |

(52) U.S. Cl.
CPC .......... *G02B 27/0101* (2013.01); *B60K 35/00* (2013.01); *G02B 26/0816* (2013.01); *G02B 26/10* (2013.01); *G09G 3/025* (2013.01); *B60K 2370/1529* (2019.05); *B60K 2370/166* (2019.05); *B60K 2370/23* (2019.05); *B60K 2370/333* (2019.05); *G09G 2380/10* (2013.01)

(58) Field of Classification Search
CPC ................ G02B 27/01; G02B 27/0101; G02B 26/0816; G02B 26/0841; G02B 26/0825; G02B 26/0858; G02B 26/085; G02B 26/0866; G02B 26/08; G02B 26/10; G02B 26/101; G02B 26/105; B60K 35/00; G09G 3/025
See application file for complete search history.

(56) References Cited

U.S. PATENT DOCUMENTS

| | | | |
|---|---|---|---|
| 5,351,151 A | 9/1994 | Levy | |
| 2012/0120470 A1* | 5/2012 | Kitazawa | ........... G02B 26/0833 |
| | | | 359/221.3 |
| 2015/0077823 A1* | 3/2015 | Hashiguchi | .......... H04N 9/3135 |
| | | | 359/200.8 |

(Continued)

FOREIGN PATENT DOCUMENTS

| | | |
|---|---|---|
| EP | 2151877 | 2/2010 |
| JP | 2006235209 | 9/2006 |

(Continued)

*Primary Examiner* — Xuemei Zheng
(74) *Attorney, Agent, or Firm* — Jordan IP Law, LLC

(57) ABSTRACT

Systems, apparatus, computer implemented methods, and computer program products to enhance the operation of a vehicle. A HUD apparatus includes a laser light source to generate laser light to be reflected an optical member, one or more elastically deformable position adjustment members, and one or more UV light sources. The elastically deformable position adjustment members are operable to adjust a spatial orientation of the optical member, and include one or more photochromatic regions to facilitate movement of the one or more elastically deformable position adjustment members from a contracted state to an expanded state in response to exposure to UV light emitted by the U light source(s). In that way, adjustments in the spatial orientation of the optical member and a change in direction of laser light reflected by the optical member as obtained.

20 Claims, 10 Drawing Sheets

(56) References Cited

U.S. PATENT DOCUMENTS

| | | |
|---|---|---|
| 2015/0124150 A1 | 5/2015 | Hibino |
| 2017/0018688 A1 | 1/2017 | Mazed et al. |
| 2017/0269352 A1* | 9/2017 | Hashiguchi .......... G02B 26/101 |
| 2018/0254001 A1 | 9/2018 | Koren |
| 2018/0282147 A1* | 10/2018 | Shinkawa ............. B81B 3/0018 |
| 2019/0171008 A1 | 6/2019 | Koren |
| 2021/0274137 A1 | 9/2021 | Goto et al. |

FOREIGN PATENT DOCUMENTS

| | | |
|---|---|---|
| JP | 2006259315 | 9/2006 |
| WO | 2020239235 | 12/2020 |

* cited by examiner

DYNAMIC ADJUSTMENT OF MICROMIRROR FOR HEADS-UP DISPLAY USING PHOTOCHROMATIC MATERIAL

TECHNICAL FIELD

One or more embodiments relate generally to a vehicle, a heads-up display (HUD) apparatus, a HUD system for implementation in a vehicle, a computer implemented method of operating a vehicle, and a computer program product for operating a vehicle.

BACKGROUND

Generally, a HUD system for implementation in a vehicle are used to provide guidance and other information to a driver during operation of the vehicle. The HUD system typically utilizes a micromirror to redirect laser light emitted by laser a light source towards a display such as a windshield or other transparent panel. Adjusting the spatial position or orientation of the micromirror is generally accomplished via one or more electrostatic actuators to linearly translate or rotate the micromirror using an actuation voltage.

BRIEF SUMMARY

One or more embodiments relate to a vehicle, a heads-up display (HUD) apparatus, a HUD system for implementation in a vehicle, a computer implemented method of operating a vehicle, and a computer program product for operating a vehicle that are operable to enhance the operation of a vehicle.

In accordance with one or more embodiments, the HUD apparatus includes an elastically deformable material having photochromatic properties that is dynamically moveable in response to exposure to ultraviolet light. The elastically deformable material comprises an organic material such as, for example, spiropyran, that is embedded into a substrate material. The spiropyran will expand and contract in response to exposure to ultraviolet light. Using an elastically deformable material obviates the need for electrostatic actuators to cause adjustable movement of the micromirror, thereby resulting in significant cost savings and a reduction in overall weight of the lighting system.

In accordance with one or more embodiments, an example display apparatus, which may be operable for implementation in a vehicle, comprises one or more of the following: a laser light source to generate laser light; an optical member to reflect the laser light from the laser light source; one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to ultraviolet (UV) light; and one or more UV light sources operable to selectively emit illuminating UV light in a direction that contacts the one or more photochromatic regions to thereby adjust the spatial orientation of the optical member and change a direction of laser light reflected by the optical member.

In accordance with one or more embodiments, an example display apparatus, which may be operable for implementation in a vehicle, comprises one or more of the following: one or more laser light sources to generate laser light; one or more optical members in an array to reflect the laser light from a corresponding one of the laser light sources; one or more elastically deformable position adjustment members operable to adjust a spatial orientation of a corresponding one of the optical members, the one or more elastically deformable position adjustment members having one or more photochromatic regions to facilitate movement of the one or more elastically deformable position adjustment members from a contracted state to an expanded state in response to exposure to UV light; and one or more UV light sources operable to selectively emit illuminating UV light in a direction that contacts the one or more photochromatic regions of a corresponding one of the elastically deformable position adjustment members to thereby adjust the spatial orientation of a corresponding one of the optical members and change a direction of laser light reflected by the corresponding one of the optical members.

In accordance with one or more embodiments, the example display apparatus may comprise a HUD display.

In accordance with the example display apparatus, the one or more elastically deformable position adjustment members comprises a polymer substrate and the one or more photochromatic regions comprises a photochromatic material that is embedded into the polymer substrate. The photochromatic material comprises an organic material that itself comprises spiropyran.

In accordance with the example display apparatus, the one or more UV light sources comprise LED light sources.

In accordance with the example display apparatus, the one or more elastically deformable position adjustment members are arranged spaced apart on a surface, such as, for example, a bottom surface, of the optical member. Such bottom surface is opposite to the reflective surface of the optical member.

In accordance with the example display apparatus, the one or more elastically deformable position adjustment members are interconnected to each other on a surface, such as, for example, a bottom surface, of the optical member. Such bottom surface is opposite to the reflective surface of the optical member. Such bottom surface is opposite to the reflective surface of the optical member.

In accordance with one or more embodiments, a HUD system, which may be operable for implementation in a vehicle, comprises one or more of the following: an example display apparatus that includes a laser light source to generate laser light; an optical member to reflect the laser light from the laser light source; one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to UV light; and one or more UV light sources operable to selectively emit illuminating UV light in a direction that contacts the one or more photochromatic regions to thereby adjust the spatial orientation of the optical member and change a direction of laser light reflected by the optical member; and a controller, operatively coupled to the one or more second light sources, the controller including one or more processors and a non-transitory memory operatively coupled to the one or more processors comprising a set of instructions executable by the one or more processors to cause the one or more processors to: dynamically conduct an analysis of sensor data; and dynamically adjust, in response to the analysis of the sensor data, a direction of light reflected by the optical member through a selective actuation of the one or more UV light sources.

In accordance with the example display system, the sensor data relates to an operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

In accordance with the example display system, the set of instructions cause the one or more processors to dynamically adjust the direction of laser light reflected by the optical member by selectively adjusting an intensity of UV light emitted by the one or more UV light sources.

In accordance with one or more embodiments, an example computer implemented method of operating a HUD apparatus that includes a laser light source to generate laser light, an optical member to reflect the laser light from the laser light source, one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to UV light, and one or more UV light sources operable to selectively emit illuminating UV light in a direction that contacts the one or more photochromatic regions to thereby adjust the spatial orientation of the optical member and change a direction of laser light reflected by the optical member, the example computer implemented method comprising one or more of the following: dynamically conducting an analysis of sensor data; and dynamically adjusting, in response to the analysis of the sensor data, a direction of laser light reflected by the optical member by causing an adjustment in a spatial orientation of the optical member through a selective actuation of the one or more UV light sources.

In accordance with the example computer implemented method, the sensor data relates to an operational environment of a vehicle. Alternatively or additionally, the sensor data comprises image sensor data of an external operational environment of a vehicle. Alternatively or additionally, the sensor data comprises vehicle steering sensor data during operation of the vehicle. Alternatively or additionally, the sensor data comprises vehicle speed sensor data during operation of the vehicle.

In accordance with the example computer implemented method, dynamically adjusting the direction of laser light reflected by the optical member comprises selectively adjusting an intensity of UV light emitted by the one or more light sources.

In accordance with the example computer implemented method, adjusting the direction of laser light reflected by the optical member comprises selectively adjusting a spatial orientation of the one or more UV light sources.

In accordance with one or more embodiments, an example computer program product for operating the example HUD apparatus, the computer program product including at least one computer readable medium, comprising a set of instructions, which when executed by one or more processors, cause the one or more processors to: dynamically conduct an analysis of sensor data; and dynamically adjust, in response to the analysis of the sensor data, a direction of laser light reflected by the optical member by causing an adjustment in a spatial orientation of the optical member through a selective actuation of the one or more UV light sources.

In accordance with one or more embodiments, a vehicle comprises one or more of the following: a HUD system that includes a laser light source to generate laser light; an optical member to reflect the laser light from the laser light source; one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to UV light; and one or more UV light sources operable to selectively emit illuminating UV light in a direction that contacts the one or more photochromatic regions to thereby adjust the spatial orientation of the optical member and change a direction of laser light reflected by the optical member; and a controller, operatively coupled to the one or more second light sources, the controller including one or more processors and a non-transitory memory operatively coupled to the one or more processors comprising a set of instructions executable by the one or more processors to cause the one or more processors to: dynamically conduct an analysis of sensor data; and dynamically adjust, in response to the analysis of the sensor data, a direction of light reflected by the optical member through a selective actuation of the one or more UV light sources.

BRIEF DESCRIPTION OF THE SEVERAL VIEWS OF THE DRAWINGS

The various advantages of the exemplary embodiments will become apparent to one skilled in the art by reading the following specification and appended claims, and by referencing the following drawings, in which:

DETAILED DESCRIPTION

Figure 1:
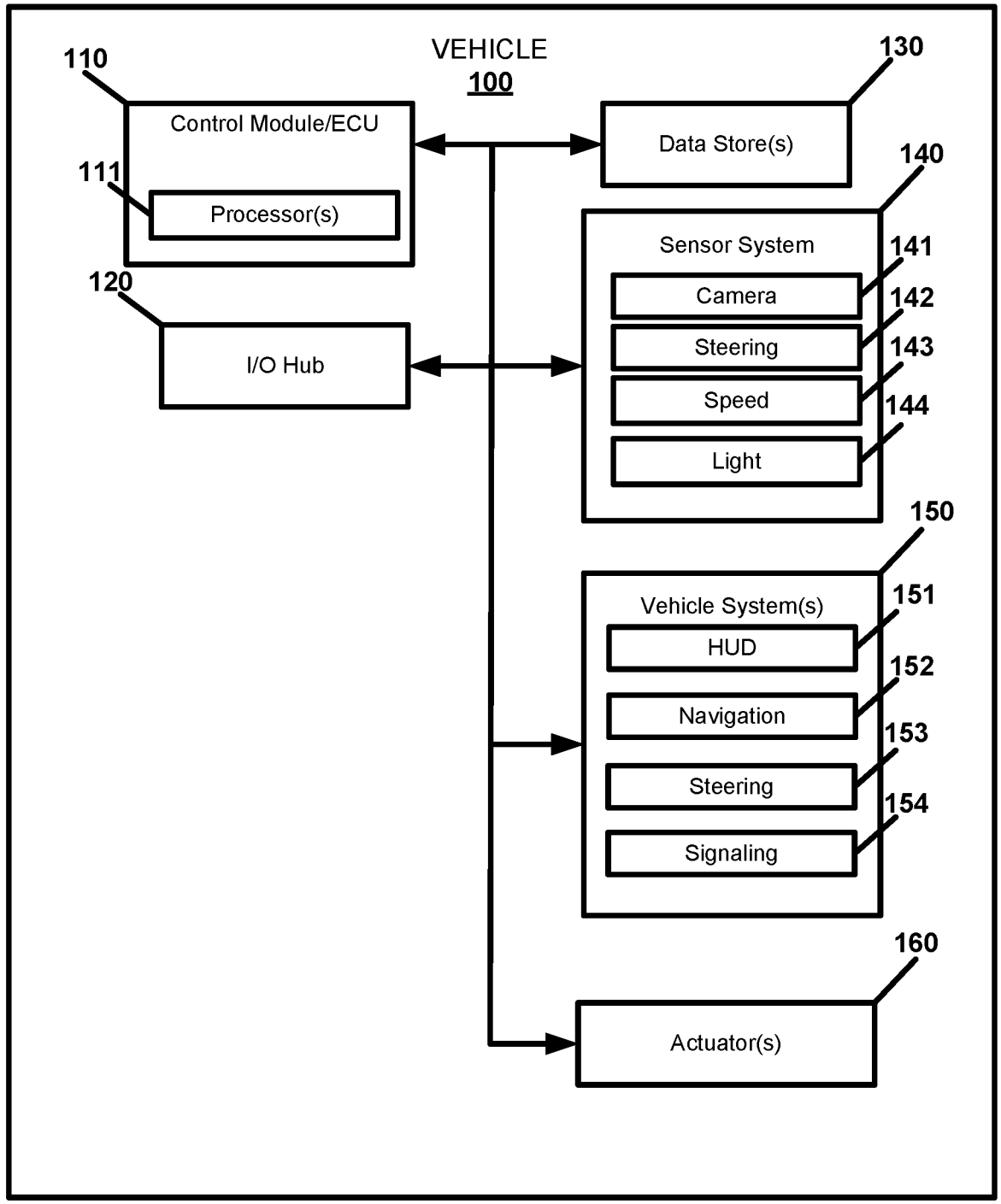
FIG. 1 illustrates an example vehicle, in accordance with one or more embodiments set forth, shown, and described herein.

Turning to the figures, in which FIG. 1 illustrates a vehicle 100, in accordance with one or more embodiments. In accordance with one or more embodiments, a "vehicle" may be in reference to any form of motorized transport. In accordance with one or more embodiments, the vehicle 100 may comprise an automobile. Embodiments, however, are not limited thereto, and thus, the vehicle 100 may comprise a watercraft, an aircraft, spacecraft, or any other form of motorized transport.

In accordance with one or more embodiments, the vehicle 100 may comprise one or more operational elements. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In accordance with one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

In accordance with one or more embodiments, the vehicle 100 comprises a control module/ECU 110 comprising one or more processors 111. As set forth, described, and/or illustrated herein, "processor" means any component or group of components that are operable to execute any of the processes described herein or any form of instructions to carry out such processes or cause such processes to be performed. The one or more processors may be implemented with one or more general-purpose and/or one or more special-purpose processors 111. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 111 may comprise at least one hardware circuit (e.g., an integrated circuit) operable to carry out instructions contained in program code. In embodiments in which there is a plurality of processors 111, such processors 111 may work independently from each other, or one or more processors 111 may work in combination with each other.

In accordance with one or more embodiments, the vehicle 100 may comprise an I/O hub 120 operatively connected to other systems of the vehicle 100. The I/O hub 120 may comprise an input interface, an output interface, and a network controller to facilitate communications between one or more vehicles 100. The input interface and the output interface may be integrated as a single, unitary interface, or alternatively, be separate as independent interfaces that are operatively connected.

The input interface is defined herein as any apparatus, device, component, system, element, or arrangement or groups thereof that enable information/data to be entered in a machine. The input interface may receive an input from a vehicle occupant (e.g. a driver or a passenger) or a remote operator of the vehicle 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touch screen, multi-touch screen, button, joystick, mouse, trackball, microphone and/or combinations thereof.

The output interface is defined herein as any apparatus, device, component, system, element or arrangement or groups thereof that enable information/data to be presented to a vehicle occupant and/or remote operator of the vehicle 100. The output interface may be operable to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

In accordance with one or more embodiments, the vehicle 100 may comprise one or more data stores 130 for storing one or more types of data. Such data may include, but is not limited to, traffic history on the roadway, accident history on the roadway, weather history, traffic laws/guidelines based on a geographic location of the vehicle 100, etc. The vehicle 100 may include interfaces that enable one or more systems thereof to manage, retrieve, modify, add, or delete, the data stored in the one or more data stores 130. The one or more data stores 130 may comprise volatile and/or non-volatile memory. Examples of suitable one or more data stores 108 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 130 may be a component of the control module/ECU 110, or alternatively, may be operatively connected to the control module/ECU 110 for use thereby. As set forth, described, and/or illustrated herein, "operatively connected" may include direct or indirect connections, including connections without direct physical contact.

In accordance with one or more embodiments, the vehicle 100 may comprise a sensor system 140 operable, at least during operation of the vehicle 100, to dynamically detect, determine, capture, assess, monitor, measure, quantify, and/or sense information about the vehicle 100 and a driving environment external to the vehicle 100. As set forth, described, and/or illustrated herein, "sensor" means any apparatus, device, component and/or system that can perform one or more of detecting, determining, assessing, monitoring, measuring, quantifying, and sensing something. The one or more sensors of the system system 140 may be operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process.

The sensor system 140 may comprise for example, one or more sensors including, but not limited to ranging sensors (e.g., light detection and ranging, radio detection and ranging/radar, sound navigation and ranging/sonar), depth sensors, and image sensors (e.g., red, green, blue/RGB camera, multi-spectral infrared/IR camera). In the illustrated example of FIG. 1, the sensor system 140 comprises a camera 141, a steering sensor 142, a speed sensor 143, and a light sensor 144. The one or more sensors 141-144 may be operable to detect, determine, capture, assess, monitor, measure, quantify, and/or sense information about the operating systems of the vehicle 100 and/or an external driving environment in which the vehicle 100 is operating. In one or more example embodiments, detection of the driving environment external to the vehicle 100 may come from one or more You Only Look Once (YOLO) detectors or one or more Single Shot Detectors (SSD).

The sensor system 140 and/or the one or more sensors 141-144 may be operatively connected to the control module/ECU 110, the one or more data stores 130, and/or other elements, components, modules of the vehicle 100. The sensor system 140 and/or any of the one or more sensors 141-144 set forth, illustrated, and described herein may be provided or otherwise positioned in any suitable location with respect to the vehicle 100. For example, one or more of the sensors 141-144 may be located internally within the vehicle 100, one or more of the sensors 141-144 may be located on the exterior of the vehicle 100, one or more of the sensors 141-144 may be located to be exposed to the exterior of the vehicle 100, and/or one or more of the sensors 141-144 may be located within a component of the vehicle 100. The one or more sensors 141-144 may be provided or otherwise positioned in any suitable manner that permits practice of the one or more embodiments.

In accordance with one or more embodiments, the one or more sensors 141-144 may work independently from each other, or alternatively, may work in combination with each other. The sensors 141-144 may be used in any combination, and may be used redundantly to validate and improve the accuracy of the detection.

In accordance with one or more embodiments, the sensor system 140 may comprise one or more image devices such as, for example, one or more cameras 141. As set forth, described, and/or illustrated herein, "camera" means any apparatus, device, component, and/or system that can capture visual data. Such visual data may include one or more of video information/data and image information/data. The visual data may be in any suitable form. The one or more cameras 141 may comprise high resolution cameras. The high resolution can refer to the pixel resolution, the spatial resolution, spectral resolution, temporal resolution, and/or radiometric resolution. Alternatively or additionally, the one or more cameras 141 may comprise high dynamic range (HDR) cameras or infrared (IR) cameras. For example, one or more of the cameras 141 may be spatially oriented, positioned, operable, operable, and/or arranged to detect, determine, capture, assess, monitor, measure, quantify, and/or sense visual data from at least a portion of the external driving environment of the vehicle 100, and/or any suitable portion within the vehicle 100, and then transmit as sensor data to the control module/ECU 110 a detection value of the detected visual data.

In accordance with one or more embodiments, one or more of the cameras 141 may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. One or more of the cameras may be operable with zoom in and/or zoom out capabilities.

In accordance with one or more embodiments, one or more of the cameras may be located within the vehicle 100. Alternatively or additionally, one or more of the cameras 141 may be fixed in a position that does not change relative to the vehicle 100. Alternatively or additionally, one or more of the cameras 141 may be movable so that its spatial orientation can change relative to the vehicle 100 in a manner which facilitates the capture of visual data from different portions of the external driving environment of the vehicle 100. Such movement of one or more of the cameras 141 may be achieved in any suitable manner, such as, for example, by rotation (about one or more rotational axes), by pivoting (about a pivot axis), by sliding (along an axis), and/or by extending (along an axis).

In accordance with one or more embodiments, the one or more cameras 141 (and/or the movement thereof) may be controlled by one or more of the control module/ECU 110, the sensor system 140, and any one or more of the modules, systems, and subsystems set forth, described, and/or illustrated herein.

In accordance with one or more embodiments, the sensor system 140 may comprise one or more vehicle steering sensors 142 operable to dynamically detect, determine, capture, assess, monitor, measure, quantify, and/or sense information relating to the steering of the vehicle 100. For example, the one or more steering sensors 142 may be operable to detect, determine, capture, assess, monitor, measure, quantify, and/or sense a steering angle or steering torque of a steering wheel of the vehicle 100, and then transmit as sensor data to the control module/ECU 110 a detection value of the detected steering angle or detected steering torque. The one or more vehicle steering sensors 142 may work independently from each other, or alternatively, may work in combination with each other. The one or more vehicle steering sensors 142 may be used in any combination, and may be used redundantly to validate and improve the accuracy of the detection.

In accordance with one or more embodiments, the sensor system 140 may comprise one or more vehicle speed sensors 143 such as, for example, speedometers, that are operable to detect, determine, capture, assess, monitor, measure, quantify, and/or sense the speed of the vehicle 100 and other vehicles in the external driving environment, and then transmit as sensor data to the control module/ECU 110 a detection value of the detected speed of the vehicle 100 and other vehicles in the external driving environment.

In accordance with one or more embodiments, the detected speed of the vehicle 100 is based on the wheel speed of one or more of the vehicle front wheels and the rear wheels. The one or more vehicle speed sensors 143 may work independently from each other, or alternatively, may work in combination with each other. The one or more vehicle speed sensors 143 may be used in any combination, and may be used redundantly to validate and improve the accuracy of the detection.

In accordance with one or more embodiments, the sensor system 140 may comprise one or more light sensors 144 that are operable to detect, determine, capture, assess, monitor, measure, quantify, and/or sense the operable state of the lighting system 151 and/or the amount of ambient light in the external driving environment, and then transmit as sensor data to the control module/ECU 110 a detection value of the detected operable state of the lighting system 151 and/or the amount of ambient light in the external driving environment.

During operation of the vehicle 100, the processor(s) of the control module/ECU 110 may be operable to selectively activate one or more of the sensors 141-144 to sense the external driving environment based on current given environmental conditions including, but not limited to the roadway, other vehicles, adjacent lanes, traffic rules, objects on the roadway, etc.

In accordance with one or more embodiment, the vehicle 100 may comprise one or more vehicle systems 150, including but not limited to a lighting system 151, a navigation system 152, a steering system 153, and a signaling system 154. Embodiments, however, are not limited thereto, and thus, the vehicle 100 may comprise more, fewer, or different systems.

In accordance with one or more embodiments, the HUD system 151 is operable to present information on one or more HUD displays to the driver or operator of the vehicle 100.

Figure 2:
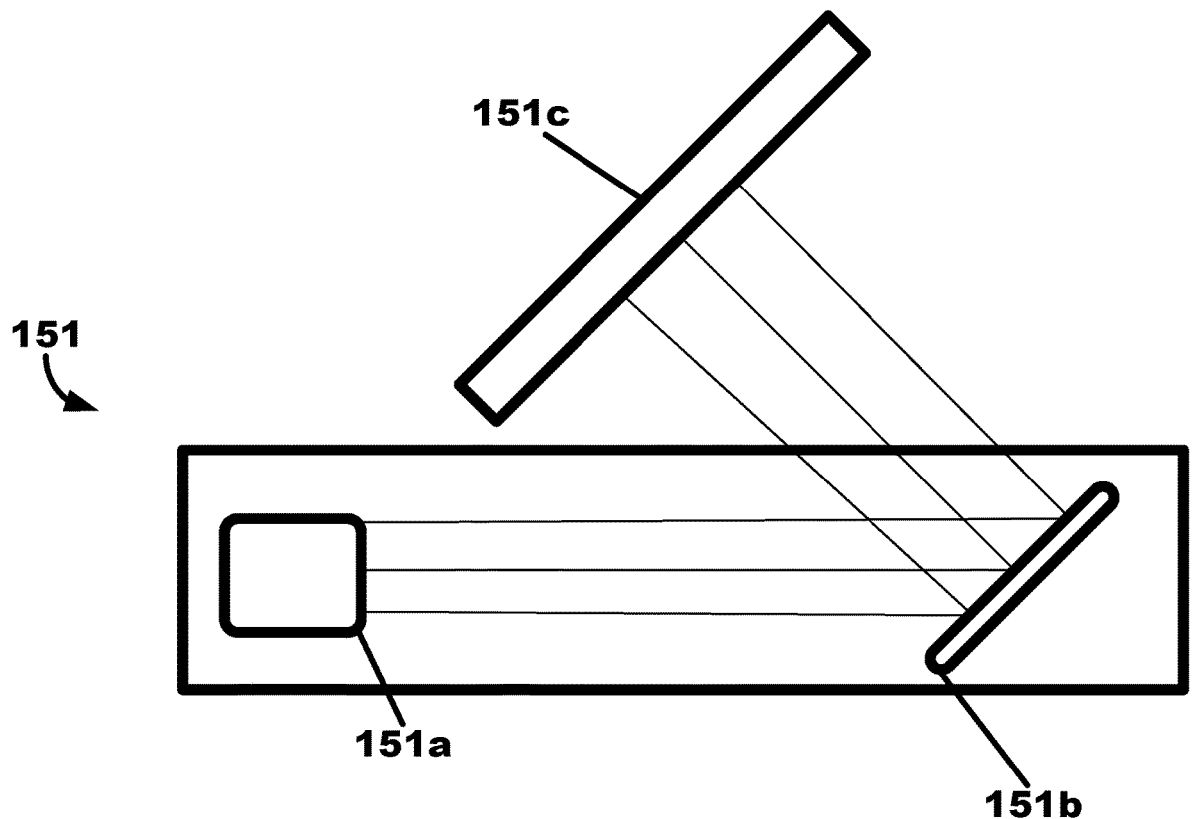
FIG. 2 illustrates an example HUD apparatus, in accordance with one or more embodiments set forth, shown, and described herein.

As illustrated in FIG. 2, in accordance with one or more embodiments, the HUD system 151 may comprise or one or laser light sources 151a to generate laser light, one or more an optical members 151b, such as for example, a micromirror, to reflect the laser light from a corresponding one of the laser light sources 151a and direct the laser light toward one or more HUD displays 151c (e.g., a vehicle windshield or to an optical assembly that itself will direct the laser light to the windshield) to be displayed as information in two-dimensional or three-dimensional form. The control module/ECU 110 may be operable to control the HUD system 151 in response to receipt of information relating to sensor data, wireless data, and information from the various vehicle systems 150.

The navigation system 152 may comprise one or more mechanisms, devices, elements, components, systems, applications and/or combinations thereof (now known or later developed), configured to determine the geographic location of the vehicle 100 and/or to determine a travel route for the vehicle 100. The navigation system 152 may comprise one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.).

In accordance with one or more embodiments, the navigation system 152 may be configured to update the travel route dynamically while the vehicle 100 is in operation. The navigation system 152 may comprise one or more of a global positioning system, a local positioning system or a geolocation system. The navigation system 152 may be implemented with any one of a number of satellite positioning systems, such as the United States Global Positioning System (GPS), the Russian Glonass system, the European Galileo system, the Chinese Beidou system, the Chinese COMPASS system, the Indian Regional Navigational Satellite System, or any system that uses satellites from a combination of satellite systems, or any satellite system developed in the future. The navigation system 152 may use Transmission Control Protocol (TCP) and/or a Geographic information system (GIS) and location services.

The navigation system 152 may comprise a transceiver configured to estimate a position of the vehicle 100 with respect to the Earth. For example, the navigation system 152 may comprise a GPS transceiver to determine the vehicle's latitude, longitude and/or altitude. The navigation system 152 may use other systems (e.g. laser-based localization systems, inertial-aided GPS, and/or camera-based localization) to determine the location of the vehicle 100. Alternatively or additionally, the navigation system 152 may be based on access point geolocation services, such as using the W3C Geolocation Application Programming Interface (API). With such a system, the location of the vehicle 100 may be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. It will be understood, therefore, that the specific manner in which the geographic position of the vehicle 100 is determined will depend on the manner of operation of the particular location tracking system used.

The steering system 153 may comprise one or more mechanisms, devices, elements, components, systems, and/or combinations thereof (now known or later developed), configured to adjust the heading of the vehicle 100.

The signaling system 154 may comprise one or more mechanisms, devices, elements, components, systems, and/or combinations thereof (now known or later developed), configured to provide illumination for the driver or operator of the vehicle 100 and/or to provide information with respect to one or more aspects of the vehicle 100. For instance, the signaling system 154 may provide information regarding the vehicle's presence, position, size, direction of travel, and/or the driver's intentions regarding direction and speed of travel of the vehicle 100. For instance, the signaling system 154 may comprise headlights, taillights, brake lights, hazard lights, and turn signal lights.

Figure 3A:
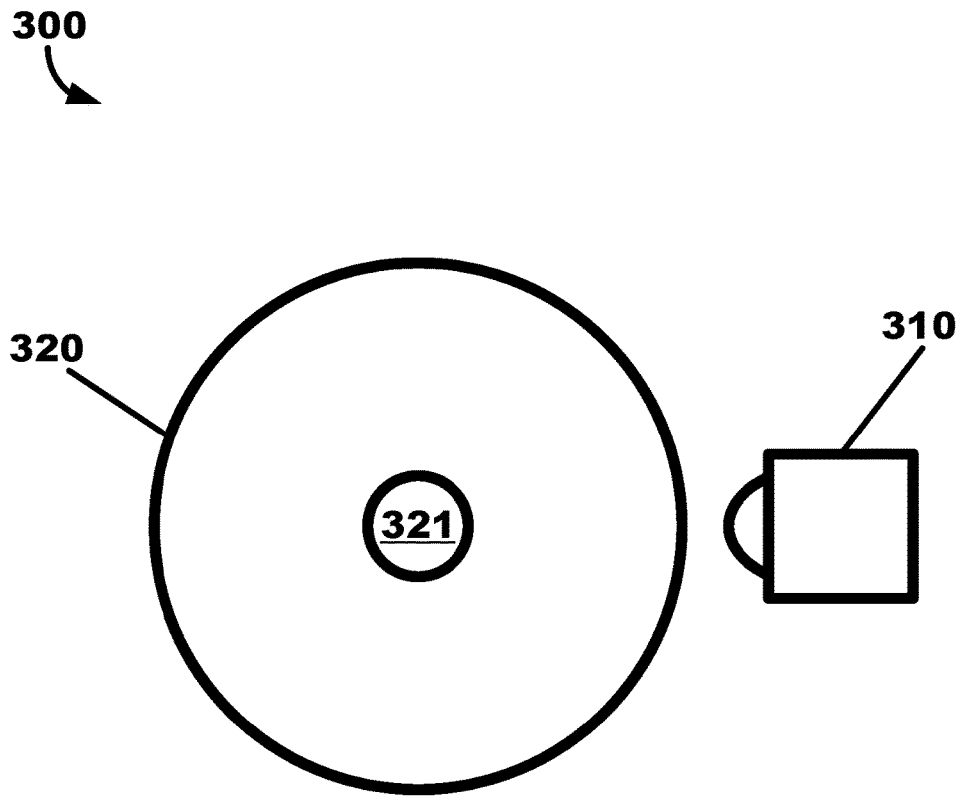
FIGS. 3A through 3C illustrate an example HUD apparatus and an elastically deformable position adjustment member of the example HUD apparatus, in accordance with one or more embodiments set forth, shown, and described herein.
Figure 3B:
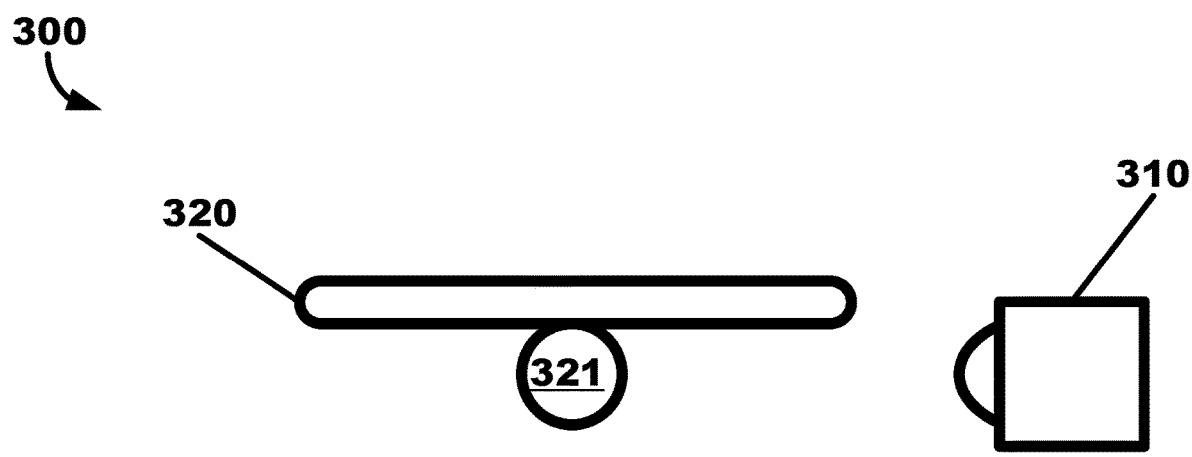

As illustrated in FIGS. 3A and 3B, an example HUD display apparatus 300 is provided in accordance with one or more embodiments. The example display apparatus 300 comprises an optical member 320 such as, for example, a micromirror operable to reflect light, and an elastically deformable position adjustment member 321 mounted on the optical member 320.

In accordance with one or more embodiments, the elastically deformable position adjustment member 321 is operable to adjust a mounting position or spatial orientation of the optical member 320. The elastically deformable position adjustment member 321 may be arranged so as to be mounted (directly or indirectly) on the surface of the optical member 320. In the illustrated example embodiment, the elastically deformable position adjustment member 321 is mounted on the bottom surface of the optical member 320. Such bottom surface is opposite to the reflective surface of the optical member 320. Embodiments, however, are not limited thereto, and thus, this disclosure contemplates the elastically deformable position adjustment member 321 being mounted on any suitable surface of the optical member 320 that falls within the spirit and scope of the principles of this disclosure. In the illustrated embodiment, the optical member 320 is transparent in order to permit viewing of the elastically deformable position adjustment member 321.

In accordance with one or more embodiments, the elastically deformable position adjustment member 321 is composed of an elastically deformable base or substrate material, such as, for example, a polymer. The elastically deformable material may comprise a shape memory material. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the elastically deformable position adjustment member 321 being composed of any suitable material that falls within the spirit and scope of the principles of this disclosure.

Figure 3C:
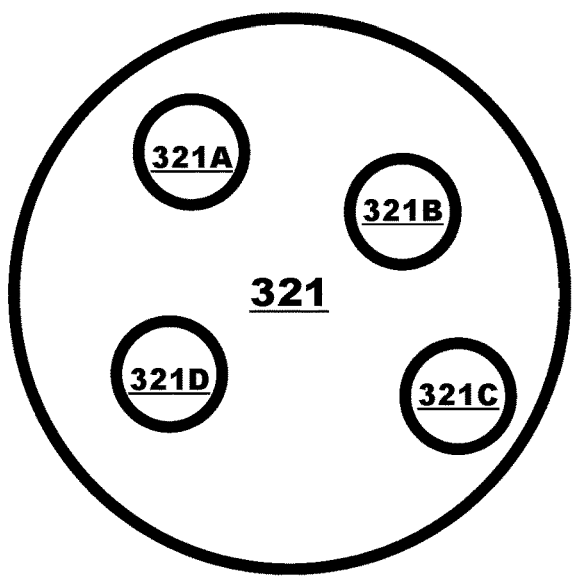

As illustrated in FIG. 3C, the elastically deformable base material of the elastically deformable position adjustment member 321 may include one or more photochromatic regions 321A, 321B, 321C, and 321D that are moveable from a contracted state to an expanded state in response to exposure to UV light. The one or more photochromatic regions 321A, 321B, 321C, and 321D may be integrated or otherwise embedded into the elastically deformable base material of the elastically deformable position adjustment member 321. The one or more photochromatic regions 321A, 321B, 321C, and 321D may be integrated or otherwise embedded so as to be partially or fully exposed from the surface of the elastically deformable position adjustment member 321. In the illustrated embodiment, the optical member 320 is transparent in order to permit viewing of the one or more photochromatic regions 321A, 321B, 321C, and 321D. The one or more photochromatic regions 321A, 321B, 321C, and 321D are composed of an organic photochromatic material, such as, for example, spiropyran. Embodiments, however, are not limited thereto, and thus, this disclosure contemplates the photochromatic regions 321A, 321B, 321C, and 321D being composed of any suitable photochromatic material or composite materials that falls within the spirit and scope of the principles of this disclosure. For example, during production of elastically deformable position adjustment member 321, the photochromatic material may be mixed into the elastically deformable base material.

The display apparatus 300 further comprises one or more UV light sources 310 operable to selectively emit illuminating UV light in a direction that selectively contacts the one or more photochromatic regions 321A, 321B, 321C, and 321D of the elastically deformable position adjustment member 321 in a manner that causes adjustment in the spatial orientation of the optical member 320. This adjustment thereby causes a change of direction of laser light reflected by the optical member 320. In particular, the optical member 320 is caused to pivot relative to the HUD display 151c about an axis defined by the elastically deformable position adjustment member 321 in a manner that changes the direction of laser light reflected by the optical member 320.

In accordance with one or more embodiments, the one or more light sources 310 comprises LEDs. The one or more light sources 310 are controlled by the control module/ECU 110. The control module/ECU 110 may be operable to control one or more of the spatial orientation of the one or more light sources 310 and the intensity of the UV light emitted by the one or more light sources 310.

For example, the spatial orientation of the one or more light sources 310 may be selectively adjusted in order to emit UV light in a direction that contacts only photochromatic regions 321A and 321B but not photochromatic regions 321C and 321D. This adjustment may be necessary in order to direct the laser light reflected by the lighting apparatus 200 in a specific direction.

In accordance with one or more embodiments, a non-transitory memory is operatively coupled to the one or more processors 111 of the control module/ECU 110, and comprise a set of instructions executable by the one or more processors 111 to cause the one or more processors 111 to dynamically conduct an analysis of sensor data transmitted by the sensor system 140. In response to the analysis of the sensor data, the control module/ECU 110 may then dynamically adjust a direction of laser light reflected by the optical member 320 by adjusting the spatial orientation of the optical member 320 through a selective actuation of the one or more UV light sources 310.

In accordance with one or more embodiments, the adjustment in the direction of laser light reflected by the optical member 320 may be in response to sensor data relating to an operational environment of a vehicle 100. Alternatively or additionally, the adjustment in the direction of laser light reflected by the optical member 320 may be in response to sensor data relating to an external operational environment of a vehicle 100. For example, the sensor data may comprise vehicle steering data during operation of the vehicle 100. Alternatively or additionally, the sensor data may comprise vehicle speed data during operation of the vehicle 100. Alternatively or additionally, the sensor data may comprise vehicle navigational data during operation of the vehicle 100. Alternatively or additionally, the sensor data may comprise vehicle signaling data during operation of the vehicle 100.

In accordance with one or more embodiments, the amount of adjustment in the spatial orientation of the optical member 320 corresponds to amount or intensity of light emitted by the one or more UV light sources 310. Accordingly, in response to the analysis of the sensor data, the control module/ECU 110 may be operable to dynamically adjust the direction of laser light reflected by the optical member 320 by selectively adjusting an intensity of the UV light emitted by the one or more light sources 310. The greater the intensity of the UV light may thus yield greater adjustments in the spatial orientation of the optical member 320.

Figure 4A:
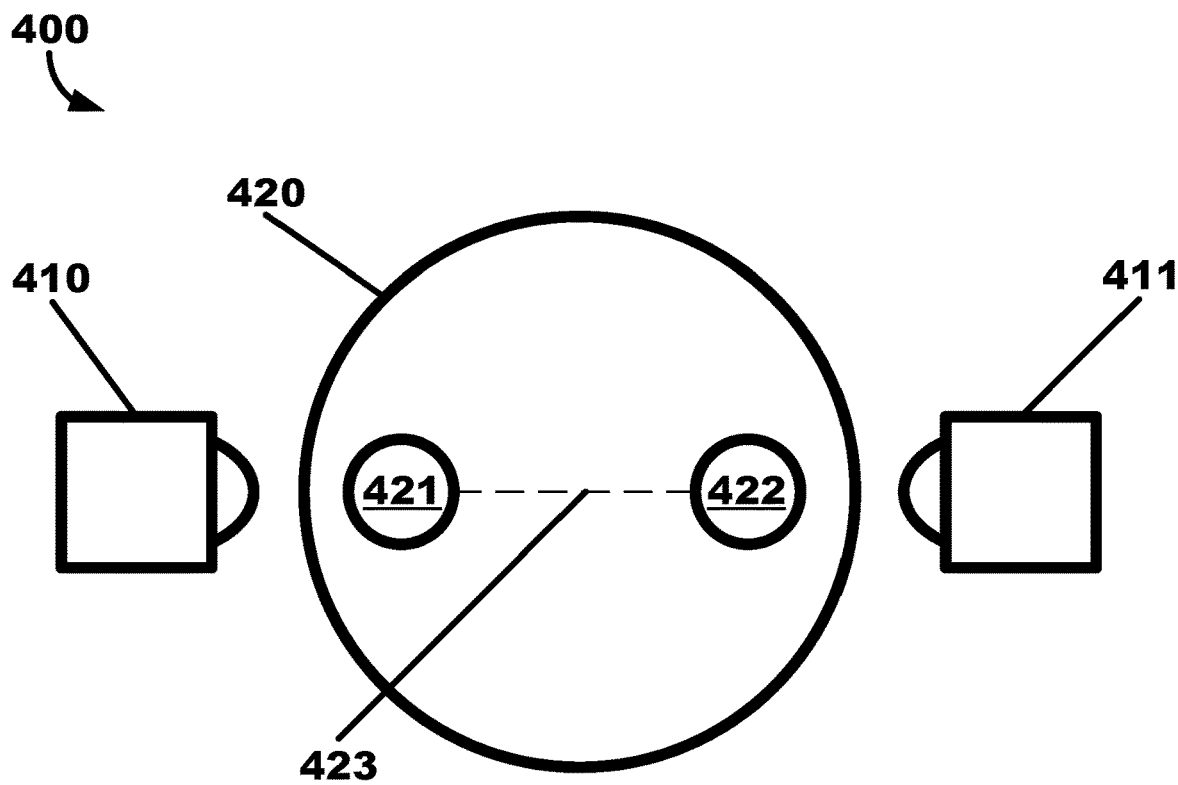
FIGS. 4A through 4C illustrate an example HUD apparatus, in accordance with one or more embodiments set forth, shown, and described herein.
Figure 4B:
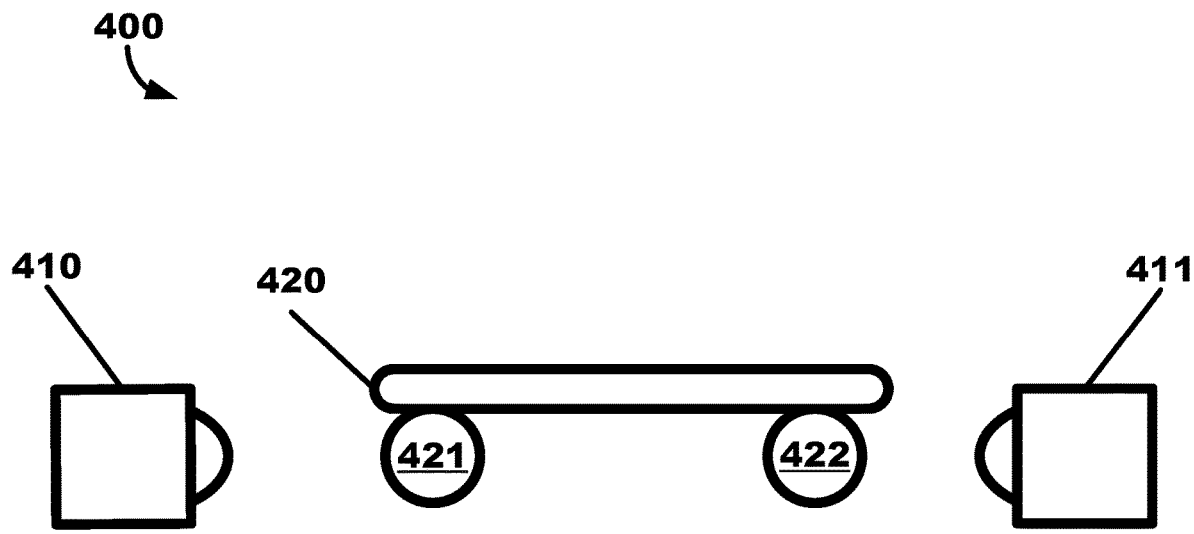

As illustrated in FIGS. 4A and 4B, an example display apparatus 400 is provided in accordance with one or more embodiments. The display apparatus 400 comprises an optical member 420 such as, for example, a micromirror to reflect light, and a pair of elastically deformable position adjustment members including a first elastically deformable position adjustment member 421 and a second elastically deformable position adjustment member 422 that are respectively mounted spaced apart from each other on a surface of the optical member 420. Alternatively or additionally, the elastically deformable position adjustment members 421, 422 may be interconnected to each other via one or more links 423 to form a unitary elastically deformable position adjustment apparatus. Alternatively or additionally, the elastically deformable position adjustment members 421, 422 may be interconnected to each other via direct contact at respective contact interfaces to form a unitary elastically deformable position adjustment apparatus. In the illustrated embodiment, the optical member 420 is transparent in order to permit viewing of the elastically deformable position adjustment members 421, 422. Although the illustrated example embodiment shows two elastically deformable position adjustment members 421 and 422, embodiments are not limited thereto. This disclosure contemplates the overall number of elastically deformable position adjustment members may include more or less elastically deformable position adjustment members with respective light sources according to the spirit of the invention.

In accordance with one or more embodiments, the optical member 420 may be mounted on a substrate via the first elastically deformable position adjustment member 421 and the second elastically deformable position adjustment member 422. Although the illustrated example embodiment shows a symmetric arrangement of the first elastically deformable position adjustment member 421 and the second elastically deformable position adjustment member 422 on the optical member 420, embodiments are not limited thereto. This disclosure contemplates the first elastically deformable position adjustment member 421 and the second elastically deformable position adjustment member 422 being mounted asymmetrically in a manner that falls within the spirit and scope of the principles of this disclosure.

In accordance with one or more embodiments, the first elastically deformable position adjustment member 421 and the second elastically deformable position adjustment member 422 are operable to adjust a spatial orientation of the optical member 420. The first elastically deformable position adjustment member 421 and the second elastically deformable position adjustment member 422 may be arranged so as to be mounted (directly or indirectly) on the surface of the optical member 420. In the illustrated example embodiment, the first elastically deformable position adjustment member 421 and the second elastically deformable position adjustment member 422 are mounted on the bottom surface of the optical member 420. Such bottom surface is opposite to the reflective surface of the optical member 420. Embodiments, however, are not limited thereto, and thus, this disclosure contemplates the first elastically deformable position adjustment member 421 and the second elastically deformable position adjustment member 422 being mounted on any suitable surface of the optical member 420 that falls within the spirit and scope of the principles of this disclosure.

In accordance with one or more embodiments, the first elastically deformable position adjustment member 421 and the second elastically deformable position adjustment member 422 are composed of an elastically deformable base or substrate material, such as, for example, a polymer. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the first elastically deformable position adjustment member 421 and the second elastically deformable position adjustment member 422 being composed of any suitable material that falls within the spirit and scope of the principles of this disclosure.

Analogously to the example embodiment of FIG. 3C, the elastically deformable base material of the first elastically deformable position adjustment member 421 and the second elastically deformable position adjustment member 422 may include one or more photochromatic regions that are moveable from a contracted state to an expanded state in response to exposure to UV light. The one or more photochromatic regions may be integrated or otherwise embedded into the elastically deformable base material of the first elastically deformable position adjustment member 421 and the second elastically deformable position adjustment member 422. The one or more photochromatic regions are composed of an organic photochromatic material, such as, for example, spiropyran. Embodiments, however, are not limited thereto, and thus, this disclosure contemplates the photochromatic regions being composed of any suitable photochromatic material or composite materials that falls within the spirit and scope of the principles of this disclosure. For example, during production of first elastically deformable position adjustment member 421 and the second elastically deformable position adjustment member 422, the photochromatic material may be mixed into the elastically deformable base material.

Figure 4C:
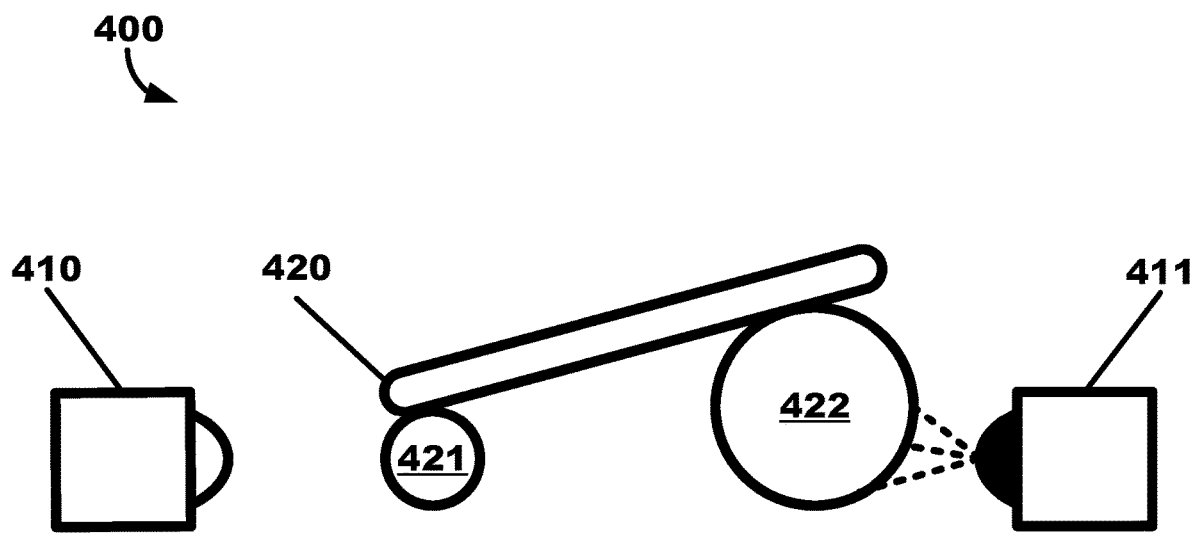

The display apparatus 400 further comprises one or more UV light sources that include a first UV light source 410 and a second UV light source 411 respectively operable to selectively emit illuminating UV light in a direction that selectively contacts the one or more photochromatic regions of the first elastically deformable position adjustment member 421 and the second elastically deformable position adjustment member 422 in a manner that causes adjustment in the mounting position (i.e., spatial orientation) of the optical member 420. This adjustment thereby causes a change of direction of laser light reflected by the optical member 420. In particular, as illustrated in FIG. 4C, the optical member 420 may be caused to pivot relative to the HUD display 151c about an axis defined by one or both of the first elastically deformable position adjustment member 421 and the second elastically deformable position adjustment member 422 in a manner that changes the direction of light reflected by the optical member 420.

In accordance with one or more embodiments, the first UV light source 410 and the second UV light source 411 comprises LEDs. The first UV light source 410 and the second UV light source 411 are controlled by the control module/ECU 110. The control module/ECU 110 may be operable to control one or more of the spatial orientation of the first UV light source 410 and the second UV light source 411 and the intensity of the UV light emitted by the first UV light source 410 and the second UV light source 411.

For example, the spatial orientation of the first UV light source 410 and the second UV light source 411 may be selectively adjusted in order to emit UV light in a direction that contacts only certain photochromatic regions but not other photochromatic regions. This adjustment may be necessary in order to direct the laser light reflected by the optical member 420 in a specific direction towards the HUD display 151c.

In accordance with one or more embodiments, the control module/ECU 110 may include a non-transitory memory operatively coupled to the one or more processors 111, the non-transitory memory comprising a set of instructions executable by the one or more processors 111 to cause the one or more processors 111 to dynamically conduct an analysis of sensor data transmitted by the sensor system 140. In response to the analysis of the sensor data, the control module/ECU 110 may then dynamically adjust a direction of laser light reflected by the optical member 420 by adjusting the spatial orientation of the optical member 420 through a selective actuation of the first UV light source 310 and the second UV light source 411.

In accordance with one or more embodiments, the adjustment in the direction of laser light reflected by the optical member 420 may be in response to sensor data relating to an operational environment of a vehicle 100. Alternatively or additionally, the adjustment in the direction of laser light reflected by the optical member 420 may be in response to sensor data relating to an external operational environment of a vehicle 100. For example, the sensor data may comprise vehicle steering data during operation of the vehicle 100. Alternatively or additionally, the sensor data may comprise vehicle speed data during operation of the vehicle 100. Alternatively or additionally, the sensor data may comprise vehicle navigational data during operation of the vehicle 100. Alternatively or additionally, the sensor data may comprise vehicle signaling data during operation of the vehicle 100.

In accordance with one or more embodiments, the adjustment of the spatial orientation of the optical member 420 corresponds to amount or intensity of light emitted by the first UV light source 410 and the second UV light source 411. Accordingly, in response to the analysis of the sensor data, the ADB controller 151A and/or the control module/

ECU 110 may be operable to dynamically adjust the direction of laser light reflected by the optical member 420 by selectively adjusting an intensity of the UV light emitted by the first UV light source 410 and the second UV light source 411. The greater the intensity of the UV light may thus yield greater adjustments in the spatial orientation of the optical member 420.

Figure 5:
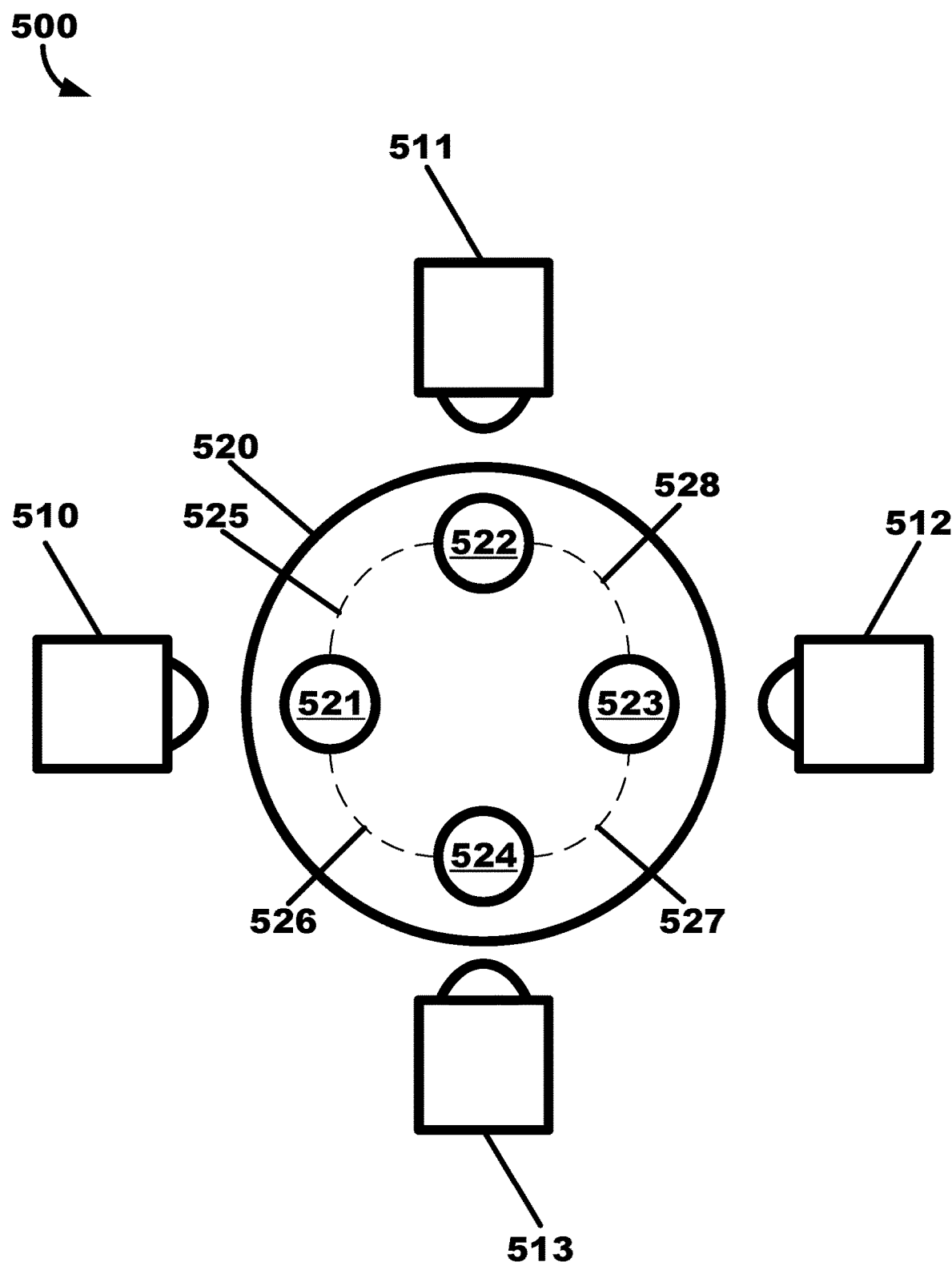
FIG. 5 illustrates an example HUD apparatus, in accordance with one or more embodiments set forth, shown, and described herein.

As illustrated in FIG. 5, an example display apparatus 500 is provided in accordance with one or more embodiments. The display apparatus 500 comprises an optical member 520 such as, for example, a micromirror to reflect light, and a plurality of elastically deformable position adjustment members including a first elastically deformable position adjustment member 521, a second elastically deformable position adjustment member 522, a third elastically deformable position adjustment member 523, and a fourth elastically deformable position adjustment member 524 that are respectively mounted spaced apart from each on a surface of the optical member 520. Alternatively or additionally, the elastically deformable position adjustment members 521, 522, 523, and 524 may be interconnected to each other via links 525, 526, 527, and 528 to form a unitary elastically deformable position adjustment apparatus. Alternatively or additionally, the elastically deformable position adjustment members 521, 522, 523, and 524 may be interconnected to each other via direct contact at respective contact interfaces to form a unitary elastically deformable position adjustment apparatus. In the illustrated embodiment, the optical member 520 is transparent in order to permit viewing of the elastically deformable position adjustment members 521, 522, 523, and 524. Although the illustrated example embodiment shows four elastically deformable position adjustment members 521, 522, 523, and 524, embodiments are not limited thereto. This disclosure contemplates the overall number of elastically deformable position adjustment members may include more or less elastically deformable position adjustment members with respective light sources according to the spirit of the invention In accordance with one or more embodiments, the optical member 520 may be mounted on a substrate via the first elastically deformable position adjustment member 521, the second elastically deformable position adjustment member 522, the third elastically deformable position adjustment member 523, and the fourth elastically deformable position adjustment member 524. Although the illustrated example embodiment shows symmetric arrangement of the elastically deformable position adjustment members 521, 522, 523, and 524, embodiments are not limited thereto. This disclosure contemplates mounting the elastically deformable position adjustment members 521, 522, 523, and 524 asymmetrically in a manner that falls within the spirit and scope of the principles of this disclosure.

In accordance with one or more embodiments, the first elastically deformable position adjustment member 521, the second elastically deformable position adjustment member 522, the third elastically deformable position adjustment member 523, and the fourth elastically deformable position adjustment member 524 are operable to adjust a spatial orientation of the optical member 520. The first elastically deformable position adjustment member 521, the second elastically deformable position adjustment member 522, the third elastically deformable position adjustment member 523, and the fourth elastically deformable position adjustment member 524 may be arranged so as to be mounted (directly or indirectly) in a manner that engages the surface of the optical member 520. In the illustrated example embodiment, the first elastically deformable position adjustment member 521, the second elastically deformable position adjustment member 522, the third elastically deformable position adjustment member 523, and the fourth elastically deformable position adjustment member 524 are mounted to engage the bottom surface of the optical member 520. Such bottom surface is opposite to the reflective surface of the optical member 520. Embodiments, however, are not limited thereto, and thus, this disclosure contemplates the elastically deformable position adjustment members 521, 522, 523, and 524 being mounted so as to engage any suitable surface of the optical member 520 that falls within the spirit and scope of the principles of this disclosure.

In accordance with one or more embodiments, the first elastically deformable position adjustment member 521, the second elastically deformable position adjustment member 522, the third elastically deformable position adjustment member 523, and the fourth elastically deformable position adjustment member 524 are composed of an elastically deformable base or substrate material, such as, for example, a polymer. Such a polymer may include, but is not limited to, poly(methyl acrylate) (PMA), poly (methyl methacrylate) (PMMA), low-density polyethylene, and the like. Embodiments, however, are not limited thereto, and thus, this disclosure contemplates the elastically deformable position adjustment members 521, 522, 523, 524 being composed of any suitable material that falls within the spirit and scope of the principles of this disclosure.

Analogously to the example embodiment of FIG. 3C, the elastically deformable base material of the elastically deformable position adjustment members 521, 522, 523, and 524 may include one or more photochromatic regions that are moveable from a contracted state to an expanded state in response to exposure to UV light. The one or more photochromatic regions may be integrated or otherwise embedded into the elastically deformable base material of the elastically deformable position adjustment members 521, 522, 523, and 524. The one or more photochromatic regions are composed of an organic photochromatic material, such as, for example, spiropyran. Embodiments, however, are not limited thereto, and thus, this disclosure contemplates the photochromatic regions being composed of any suitable photochromatic material or composite materials that falls within the spirit and scope of the principles of this disclosure. For example, during production of the elastically deformable position adjustment members 521, 522, 523, and 524, the photochromatic material may be mixed into the elastically deformable base material.

The display apparatus 500 further comprises one or more UV light sources that include a first UV light source 510 (corresponding to the first elastically deformable position adjustment member 521), a second UV light source 511 (corresponding to the second elastically deformable position adjustment member 522), a third UV light source 512 (corresponding to the third elastically deformable position adjustment member 523), and a fourth UV light source 513 (corresponding to the fourth elastically deformable position adjustment member 424) respectively operable to selectively emit illuminating UV light in a direction that selectively contacts the one or more photochromatic regions of the elastically deformable position adjustment members 521, 522, 523, and 524 in a manner that causes adjustment in the mounting position (i.e., spatial orientation) of the optical member 520. This adjustment thereby causes a change of direction of laser light reflected by the optical member 520. In particular, the optical member 520 may be caused to pivot relative to the HUD display 151*c* about an axis defined by one or more of the elastically deformable position adjustment members 521, 522, 523, and 524 in a manner that changes the direction of laser light reflected by the optical member 520.

In accordance with one or more embodiments, the first UV light source 510, the second UV light source 511, the third UV light source 512, and the fourth UV light source 513 comprises LEDs. The UV light sources 510, 511, 512, 513 are controlled by the control module/ECU 110. The control module/ECU 110 may be operable to control one or more of the spatial orientation of the UV light sources 510, 511, 512, and 513 and the intensity of the UV light emitted by the UV light sources 510, 511, 512, and 513.

For example, the spatial orientation of the UV light sources 510, 511, 512, and 513 may be selectively adjusted in order to emit UV light in a direction that contacts only certain photochromatic regions but not other photochromatic regions. This adjustment may be necessary in order to direct the laser light reflected by the optical member 520 in a specific direction.

In accordance with one or more embodiments, the control module/ECU 110 may include a non-transitory memory operatively coupled to the one or more processors 111 comprising a set of instructions executable by the one or more processors to cause the one or more processors to dynamically conduct an analysis of sensor data transmitted by the sensor system 140. In response to the analysis of the sensor data, the module/ECU 110 may then dynamically adjust a direction of laser light reflected by the optical member 520 by adjusting the spatial orientation of the optical member 520 through a selective actuation of the UV light sources 510, 511, 512, and 513.

In accordance with one or more embodiments, the adjustment in the direction of laser light reflected by the optical member 520 may be in response to sensor data relating to an operational environment of a vehicle 100. Alternatively or additionally, the adjustment in the direction of laser light reflected by the optical member 520 may be in response to sensor data relating to an external operational environment of a vehicle 100. For example, the sensor data may comprise vehicle steering sensor data during operation of the vehicle 100. Alternatively or additionally, the sensor data may comprise vehicle speed sensor data during operation of the vehicle 100. Alternatively or additionally, the sensor data may comprise vehicle navigational data during operation of the vehicle 100. Alternatively or additionally, the sensor data may comprise vehicle signaling data during operation of the vehicle 100.

In accordance with one or more embodiments, the adjustment of the spatial orientation of the optical member 520 corresponds to amount or intensity of UV light emitted by the UV light sources 510, 511, 512, and 513. Accordingly, in response to the analysis of the sensor data, the control module/ECU 110 may be operable to dynamically adjust the direction of laser light reflected by the optical member 520 by selectively adjusting an intensity of the UV light emitted by the UV light sources 510, 511, 512, and 513. The greater the intensity of the UV light may thus yield greater adjustments in the spatial orientation of the optical member 520.

Figure 6:
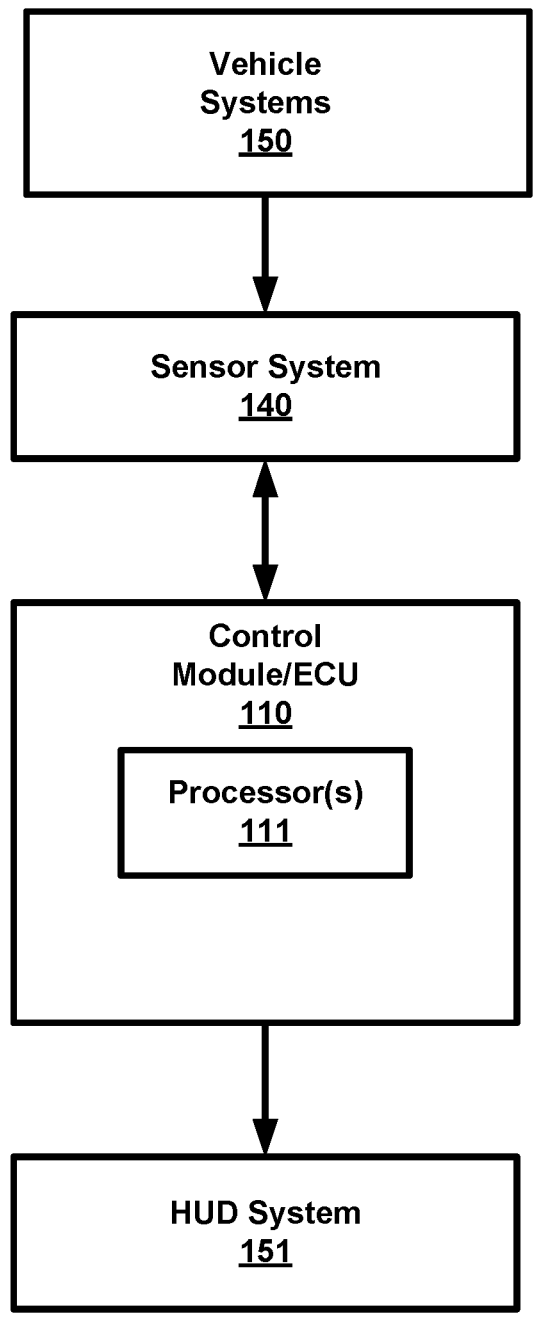
FIG. 6 illustrates an example HUD system, in accordance with one or more embodiments set forth, shown, and described herein.

As illustrated in FIGS. 5 and 6, in accordance with one or more embodiments, the sensor system 140 is operable, at least during operation of the vehicle 100, to dynamically detect information about the vehicle systems 150 and a driving environment external to the vehicle 100, and then transmit, as sensor data, data input signals (e.g., image data 701, speed data 702, steering data 703, navigation data 704, and signal data 705) to the control module/ECU 110 of the detected information. The one or more processors 111 of the control module/ECU 110, in response to the sensor data, are then operable to dynamically conduct an analysis 710 of the sensor data. In response to the analysis 710 of the sensor data, the one or more processors 111 are to then send one or more command output signals 720, 721 to the HUD system 151 to dynamically adjust a direction of laser light reflected by the optical member 320, 420, and 520 by causing movement of the optical member 320, 420, and 520 through a selective actuation of the one or more UV light sources 310, 410, 411, 510, 511, 512, and 513.

Illustrated examples shown in FIGS. 8 to 11 set forth computer implemented methods 800, 900, 1000, and 1100. The computer implemented methods 800, 900, 1000, and 1100 may be implemented, for example, in logic instructions (e.g., software), configurable logic, fixed-functionality hardware logic, etc., or any combination thereof. In accordance with one or more embodiments, execution of the computer implemented methods 800, 900, 1000, and 1100 may be performed by one or more of the control module/ECU 110.

Figure 7:
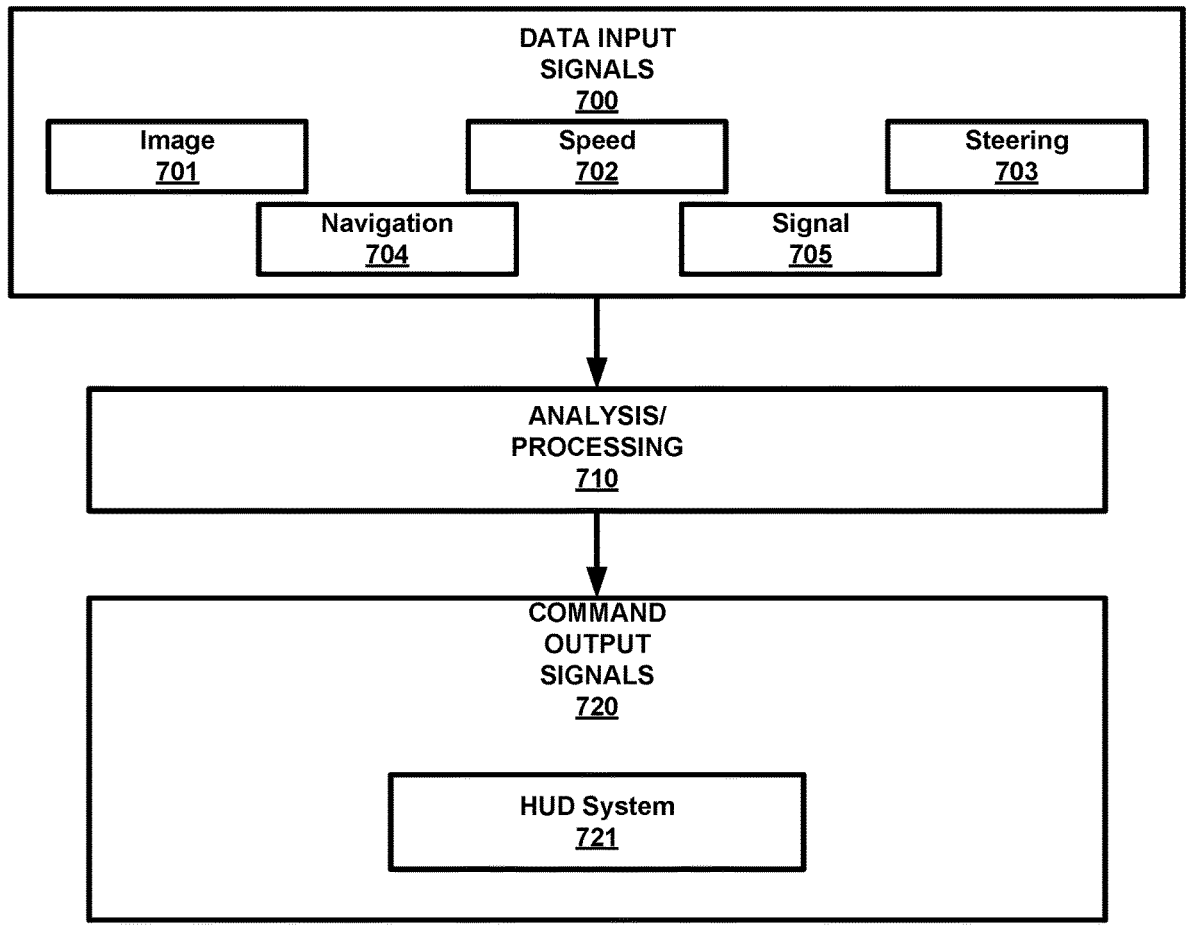
FIG. 7 illustrates a block diagram of control blocks for implementation in an example HUD system, in accordance with one or more embodiments set forth, shown, and described herein.
Figure 8:
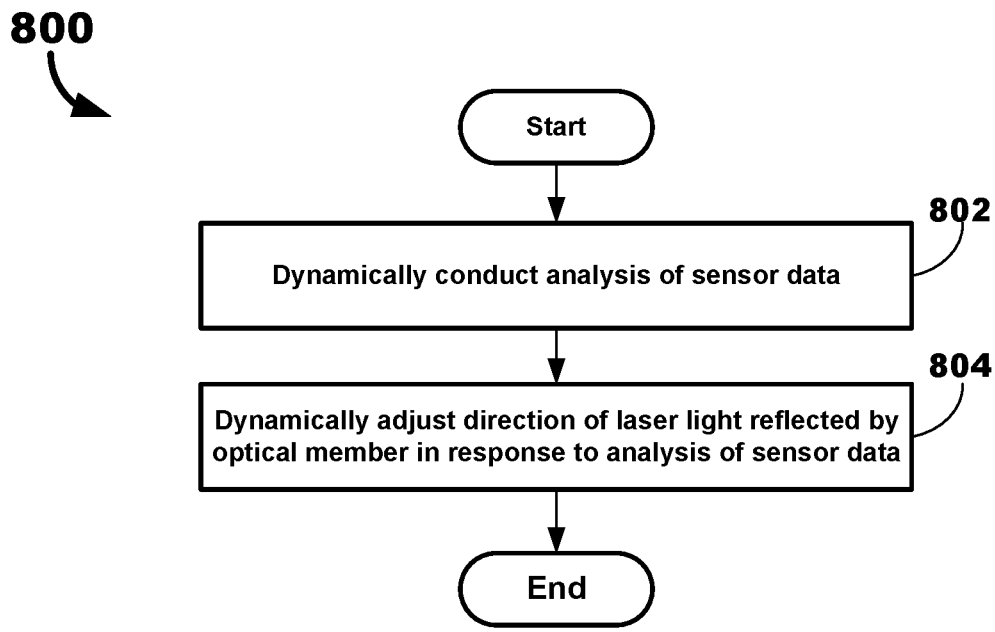
FIGS. 8 through 11 illustrate flowcharts of one or more example computer implemented methods, in accordance with one or more embodiments set forth, shown, and described herein.

In the computer implemented method 800 illustrated in FIG. 7, process block 802 includes dynamically conducting an analysis of sensor data.

In accordance with the computer implemented method 800, the sensor data relates to an operational environment of a vehicle. Alternatively or additionally, the sensor data relates to an external operational environment of a vehicle. Alternatively or additionally, the sensor data comprises vehicle steering data during operation of the vehicle. Alternatively or additionally, the sensor data comprises vehicle speed data during operation of the vehicle. Alternatively or additionally, the sensor data comprises vehicle navigation data during operation of the vehicle. Alternatively or additionally, the sensor data comprises vehicle signal data during operation of the vehicle.

The computer implemented method 800 may then proceed to illustrated process block 804, which includes dynamically adjusting, in response to the analysis of the sensor data, a direction of laser light reflected by the optical member by causing movement of the optical member through a selective actuation of the one or more UV light sources.

In accordance with the computer implemented method 800, dynamically adjusting the direction of laser light reflected by the optical member comprises selectively adjusting an intensity of UV light emitted by the one or more UV light sources.

In accordance with the computer implemented method 800, dynamically adjusting the direction of laser light reflected by the optical member comprises selectively adjusting a spatial orientation of the one or more UV light sources.

The method 800 may terminate or end after execution of process block 804.

Figure 9:
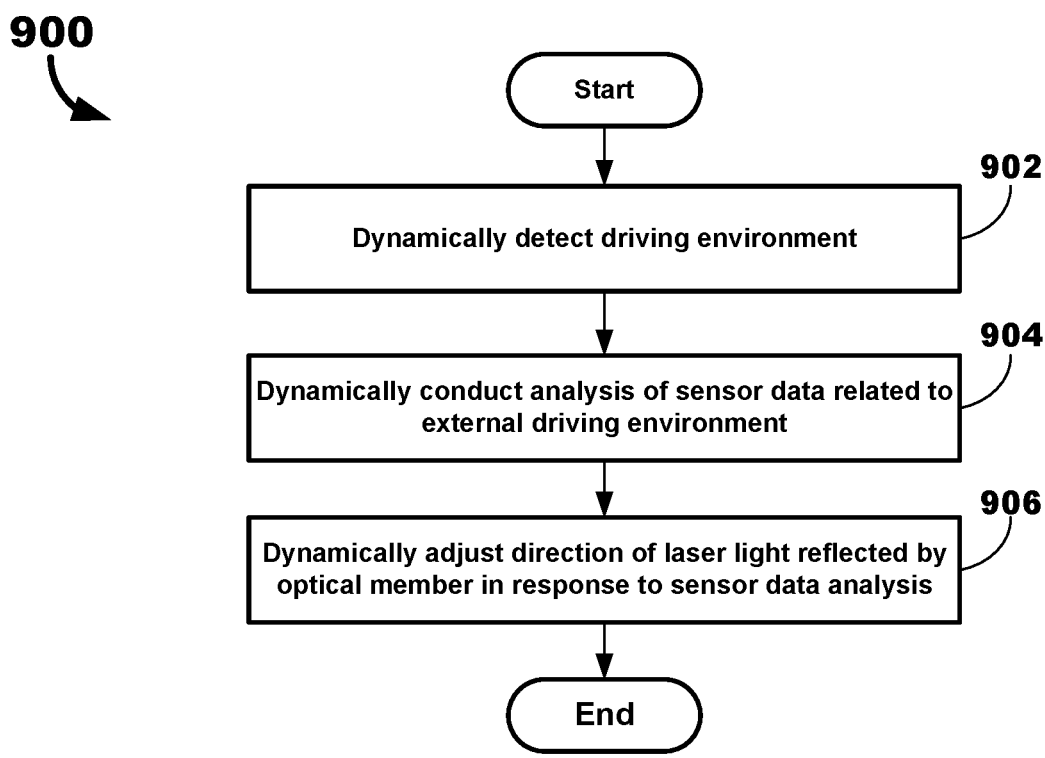

In the computer implemented method 900 illustrated in FIG. 9, illustrated process block 902 includes dynamically detecting, as sensor data, a driving environment of a vehicle.

In accordance with the computer implemented method 900, dynamically detecting the driving environment of a vehicle comprises dynamically detecting a driving environment located externally to the vehicle.

In accordance with the computer implemented method 900, at least a portion of an external driving environment of the vehicle may be dynamically sensed to detect objects on and/or adjacent to the roadway. Such objects may include, but is not limited to, other vehicles, pedestrians, animals, fallen trees, rocks, etc. in the external driving environment.

In accordance with the computer implemented method 900, the sensor data relates to an operational environment of a vehicle. Alternatively or additionally, the sensor data relates to an external operational environment of a vehicle. Alternatively or additionally, the sensor data comprises vehicle steering data during operation of the vehicle. Alternatively or additionally, the sensor data comprises vehicle speed data during operation of the vehicle. Alternatively or additionally, the sensor data comprises vehicle navigation data during operation of the vehicle. Alternatively or additionally, the sensor data comprises vehicle signal data during operation of the vehicle.

The computer implemented method 900 may then proceed to illustrated process block 904, which includes dynamically conducting an analysis of the sensor data.

The computer implemented method 900 may then proceed to illustrated process block 906, which includes dynamically adjusting, in response to the analysis of the sensor data, a direction of laser light reflected by the optical member by causing movement of the optical member through a selective actuation of the one or more UV light sources.

In accordance with the computer implemented method 900, dynamically adjusting the direction of laser light reflected by the optical member comprises selectively adjusting an intensity of UV light emitted by the one or more UV light sources.

In accordance with the computer implemented method 900, dynamically adjusting the direction of laser light reflected by the optical member comprises selectively adjusting a spatial orientation of the one or more UV light sources.

The computer implemented method 900 may terminate or end after execution of process block 906.

Figure 10:
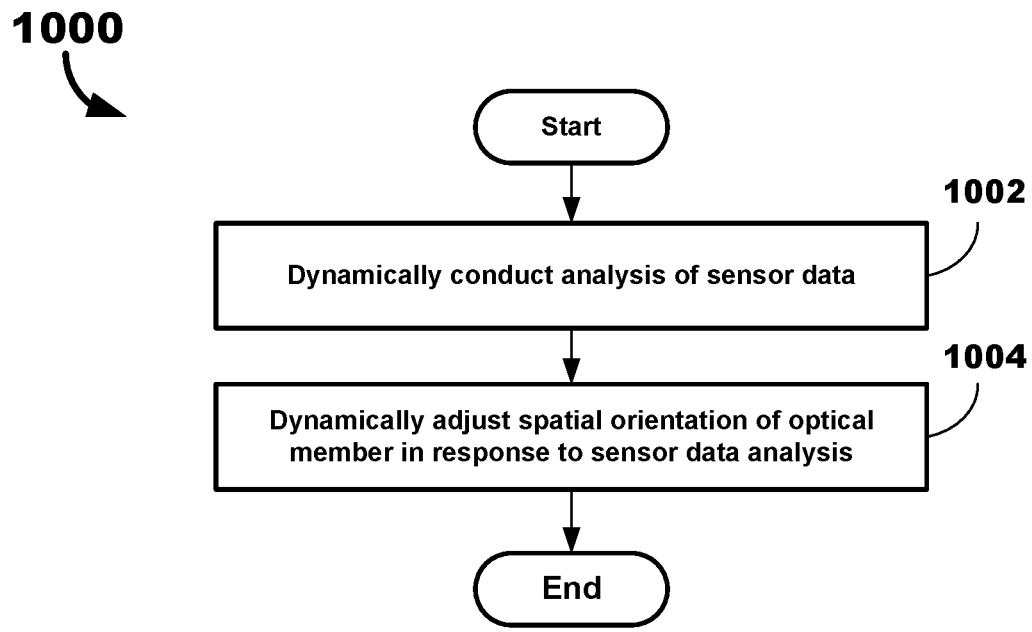

In the computer implemented method 1000 illustrated in FIG. 10, process block 1002 includes dynamically conducting an analysis of sensor data.

In accordance with the computer implemented method 1000, the sensor data relates to an operational environment of the vehicle. Alternatively or additionally, the sensor data relates to the external operational environment of a vehicle. Alternatively or additionally, the sensor data comprises vehicle steering data during operation of the vehicle. Alternatively or additionally, the sensor data comprises vehicle speed data during operation of the vehicle. Alternatively or additionally, the sensor data comprises vehicle navigation data during operation of the vehicle. Alternatively or additionally, the sensor data comprises vehicle signal data during operation of the vehicle.

In accordance with the computer implemented method 1000, dynamically adjusting the direction of laser light reflected by the optical member comprises selectively adjusting an intensity of UV light emitted by the one or more UV light sources.

In accordance with the computer implemented method 1000, dynamically adjusting the direction of laser light reflected by the optical member comprises selectively adjusting a spatial orientation of the one or more UV light sources.

The computer implemented method 1000 may then proceed to illustrated process block 1004, which includes dynamically adjusting, in response to the analysis of the sensor data, the spatial orientation of the optical member through a selective actuation of the one or more UV light sources.

The method 1000 may terminate or end after execution of process block 1004.

Figure 11:
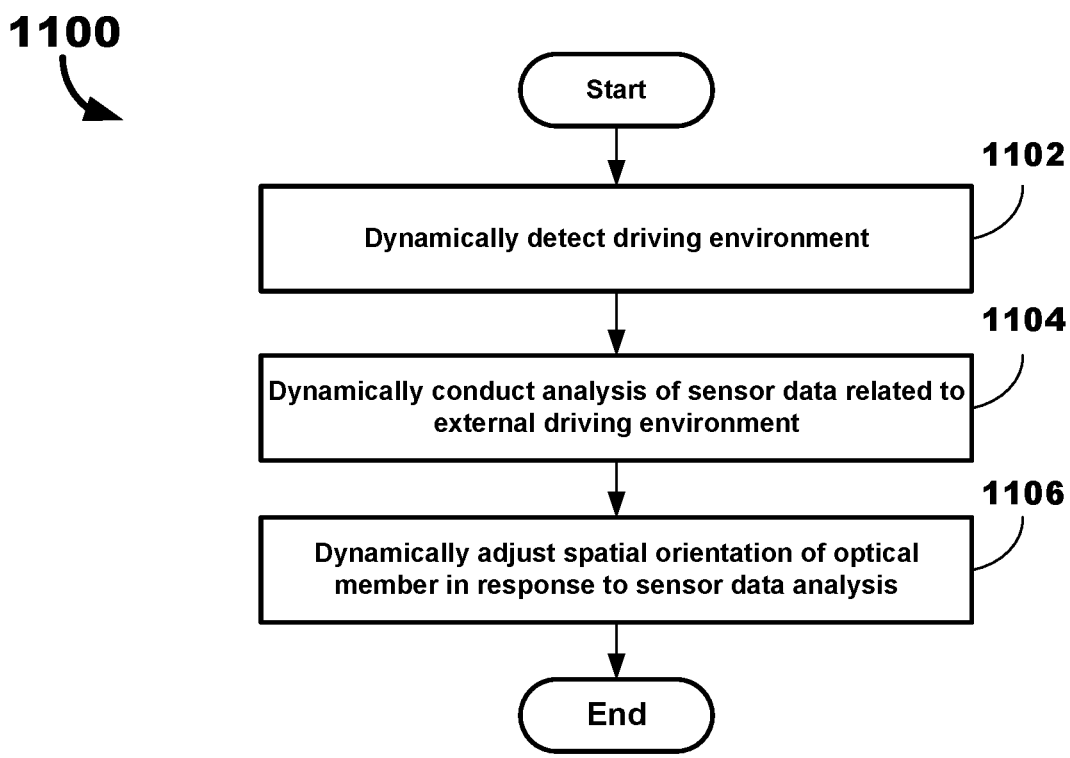

In the computer implemented method 1100 illustrated in FIG. 11, illustrated process block 1102 includes dynamically detecting, as sensor data, a driving environment of a vehicle.

In accordance with the computer implemented method 1100, dynamically detecting the driving environment of a vehicle comprises dynamically detecting a driving environment located externally to the vehicle.

In accordance with the computer implemented method 1000, at least a portion of an external driving environment of the vehicle may be dynamically sensed to detect objects on and/or adjacent to the roadway. Such objects may include, but is not limited to, other vehicles, pedestrians, animals, fallen trees, rocks, etc. in the external driving environment.

In accordance with the computer implemented method 1100, the sensor data relates to an operational environment of a vehicle. Alternatively or additionally, the sensor data relates to the external operational environment of the vehicle. Alternatively or additionally, the sensor data comprises vehicle steering data during operation of the vehicle. Alternatively or additionally, the sensor data comprises vehicle speed data during operation of the vehicle. Alternatively or additionally, the sensor data comprises vehicle navigation data during operation of the vehicle. Alternatively or additionally, the sensor data comprises vehicle signal data during operation of the vehicle.

The computer implemented method 1100 may then proceed to illustrated process block 1104, which includes dynamically conducting an analysis of the sensor data.

The computer implemented method 1100 may then proceed to illustrated process block 1106, which includes dynamically adjusting, in response to the analysis of the sensor data, a spatial orientation of an optical member of the display apparatus through a selective actuation of the one or more UV light sources.

In accordance with the computer implemented method 1100, dynamically adjusting the spatial orientation of the optical member comprises selectively adjusting an intensity of UV light emitted by the one or more UV light sources.

In accordance with the computer implemented method 1100, dynamically adjusting the spatial orientation of the optical member comprises selectively adjusting a spatial orientation of the one or more UV light sources.

The computer implemented method 1100 may terminate or end after execution of process block 1106.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A display apparatus, comprising:
a first light source to generate laser light;
an optical member to reflect the laser light from the first light source;
one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to ultraviolet (UV) light; and
one or more second light sources operable to selectively emit illuminating UV light in a direction that contacts the one or more photochromatic regions to thereby adjust the spatial orientation of the optical member and change a direction of laser light reflected by the optical member.

2. The display apparatus of claim 1, wherein:
the one or more elastically deformable position adjustment members comprises a polymer substrate, and
the one or more photochromatic regions are composed of a photochromatic material that is embedded into the polymer substrate.

3. The display apparatus of claim 2, wherein the photochromatic material comprises an organic photochromatic material.

4. The display apparatus of claim 3, wherein the organic photochromatic material comprises spiropyran.

5. The display apparatus of claim 1, wherein the one or more light sources comprise LED light sources.

6. The display apparatus of claim 1, wherein the one or more elastically deformable position adjustment members are arranged spaced apart on a surface of the optical member.

7. The display apparatus of claim 1, wherein the one or more elastically deformable position adjustment members are interconnected to each other on a surface of the optical member.

8. A display system, comprising:
a display apparatus that includes a first light source to generate laser light; an optical member to reflect the laser light from the first light source; one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to ultraviolet (UV) light; and one or more second light sources operable to selectively emit illuminating UV light in a direction that contacts the one or more photochromatic regions to thereby adjust the spatial orientation of the optical member and change a direction of laser light reflected by the optical member; and
a controller, operatively coupled to the one or more second light sources, the controller including one or more processors and a non-transitory memory operatively coupled to the one or more processors comprising a set of instructions executable by the one or more processors to cause the one or more processors to:
dynamically conduct an analysis of sensor data; and
dynamically adjust, in response to the analysis of the sensor data, a direction of laser light reflected by the optical member by causing movement of the optical member through a selective actuation of the one or more second light sources.

9. The display system of claim 8, wherein the sensor data relates to an operational environment of a vehicle.

10. The display system of claim 8, wherein the sensor data comprises navigation data of an external operational environment of a vehicle.

11. The display system of claim 8, wherein the sensor data comprises vehicle steering data during operation of the vehicle.

12. The display system of claim 8, wherein the sensor data comprises vehicle signaling data during operation of the vehicle.

13. The display system of claim 8, wherein the set of instructions cause the one or more processors to dynamically adjust the direction of light reflected by the optical member by selectively adjusting an intensity of the UV light emitted by the one or more second light sources.

14. A computer implemented method of operating a display apparatus that includes a first light source to generate laser light, an optical member to reflect the laser light from the first light source, one or more elastically deformable position adjustment members operable to adjust a spatial orientation of the optical member, the one or more elastically deformable position adjustment members having one or more photochromatic regions to facilitate movement of the one or more elastically deformable position adjustment members from a contracted state to an expanded state in response to exposure to ultraviolet (UV) light, and one or more second light sources operable to selectively emit illuminating UV light in a direction that contacts the one or more photochromatic regions to thereby adjust the spatial orientation of the optical member and change a direction of laser light reflected by the optical member, the computer implemented method comprising:
dynamically conducting an analysis of sensor data; and
dynamically adjusting, in response to the analysis of the sensor data, a direction of laser light reflected by the optical member by causing an adjustment in a spatial orientation of the optical member through a selective actuation of the one or more second light sources.

15. The computer implemented method of claim 14, wherein the sensor data relates to an operational environment of a vehicle.

16. The computer implemented method of claim 14, wherein the sensor data comprises navigation data of an external operational environment of a vehicle.

17. The computer implemented method of claim 14, wherein the sensor data comprises vehicle steering data during operation of the vehicle.

18. The computer implemented method of claim 14, wherein the sensor data comprises vehicle signaling data during operation of the vehicle.

19. The computer implemented method of claim 14, wherein dynamically adjusting the direction of laser light reflected by the optical member comprises selectively adjusting an intensity of the UV light emitted by the one or more second light sources.

20. The computer implemented method of claim 14, wherein dynamically adjusting the direction of laser light reflected by the optical member comprises selectively adjusting a spatial orientation of the one or more second light sources.

* * * * *